June 28, 1960 R. D. RUMSEY 2,942,867
DAMPING SYSTEM
Filed June 23, 1958 3 Sheets-Sheet 1
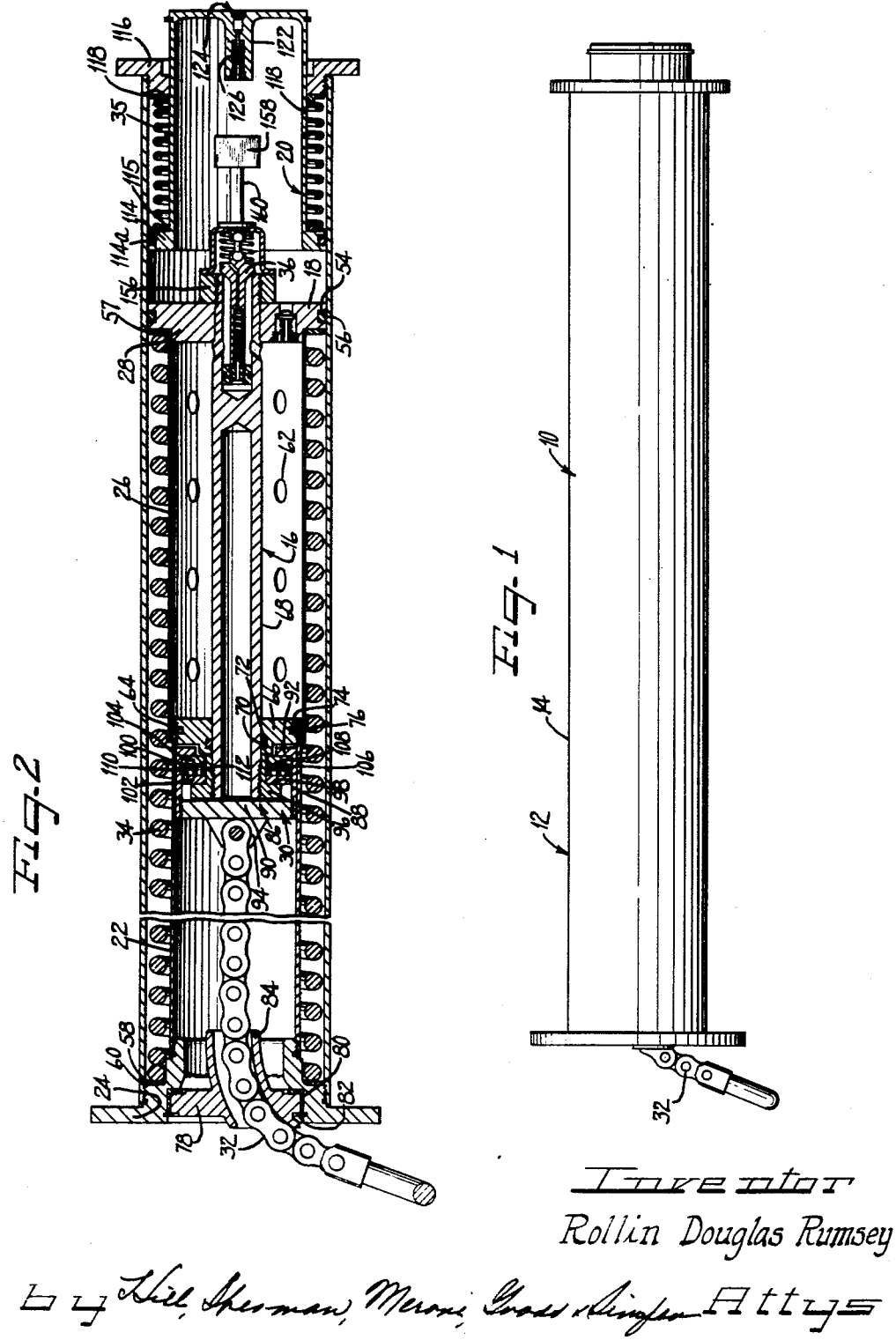
Inventor
Rollin Douglas Rumsey
by Hill, Sherman, Meroni, Gross & Singer Attys June 28, 1960
R. D. RUMSEY
2,942,867
DAMPING SYSTEM
Filed June 23, 1958
3 Sheets-Sheet 2
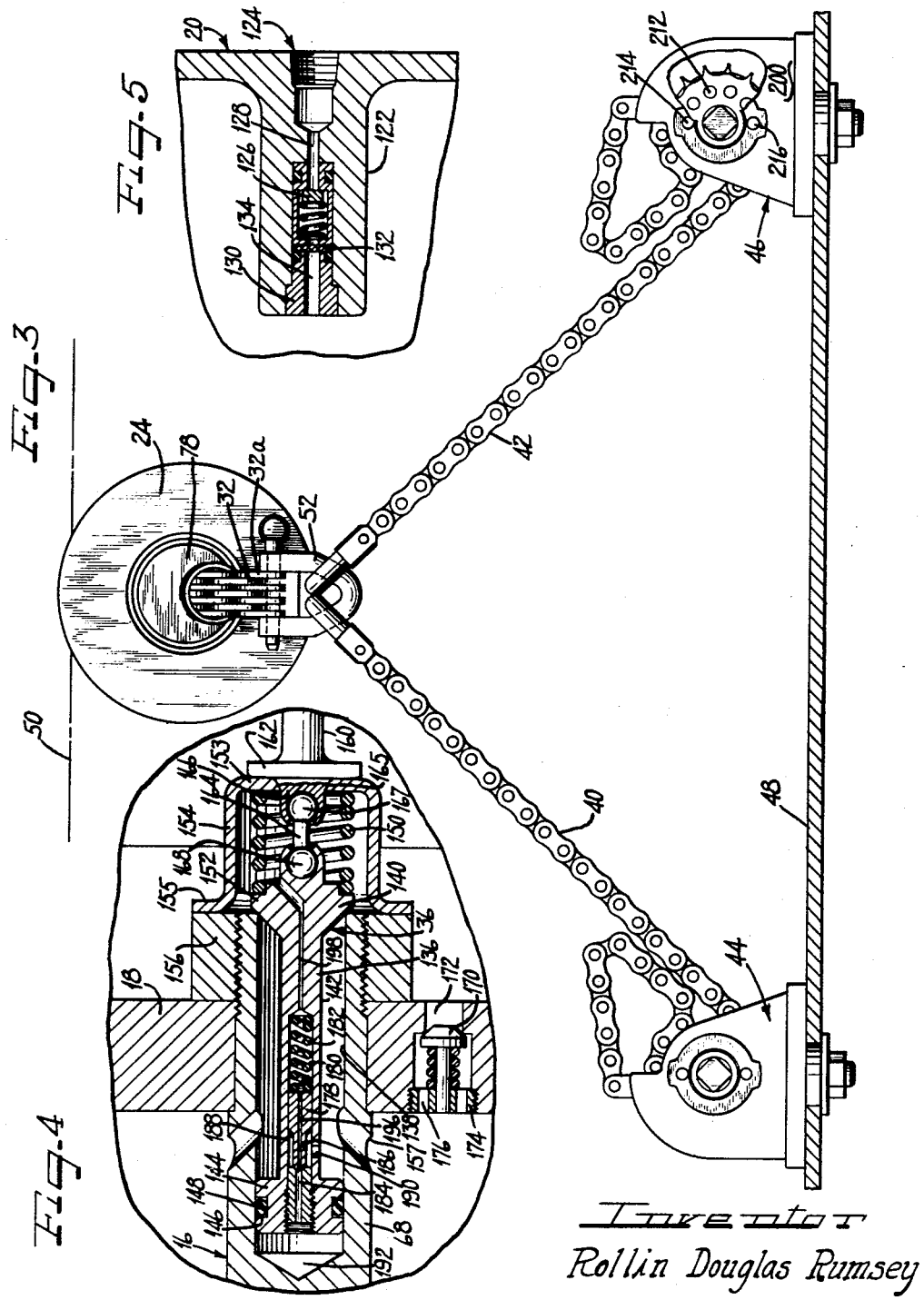
Inventor
Rollin Douglas Rumsey June 28, 1960  R. D. RUMSEY  2,942,867
DAMPING SYSTEM
Filed June 23, 1958  3 Sheets-Sheet 3
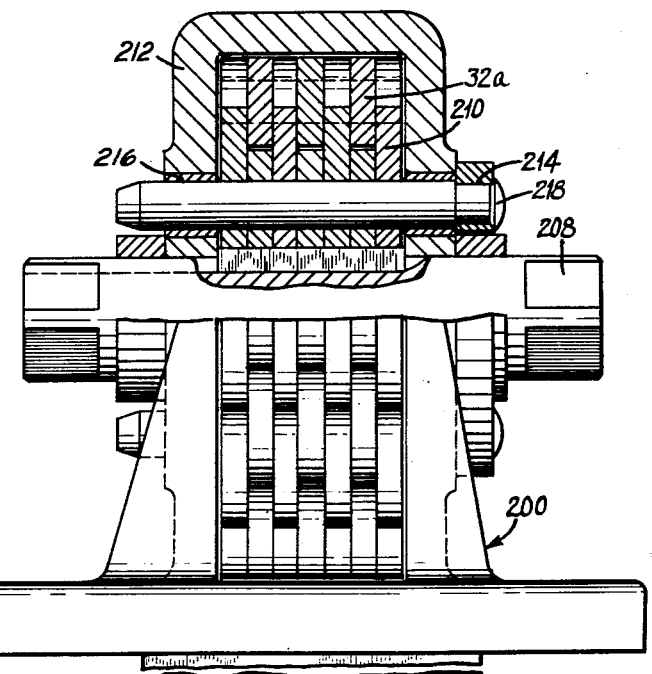
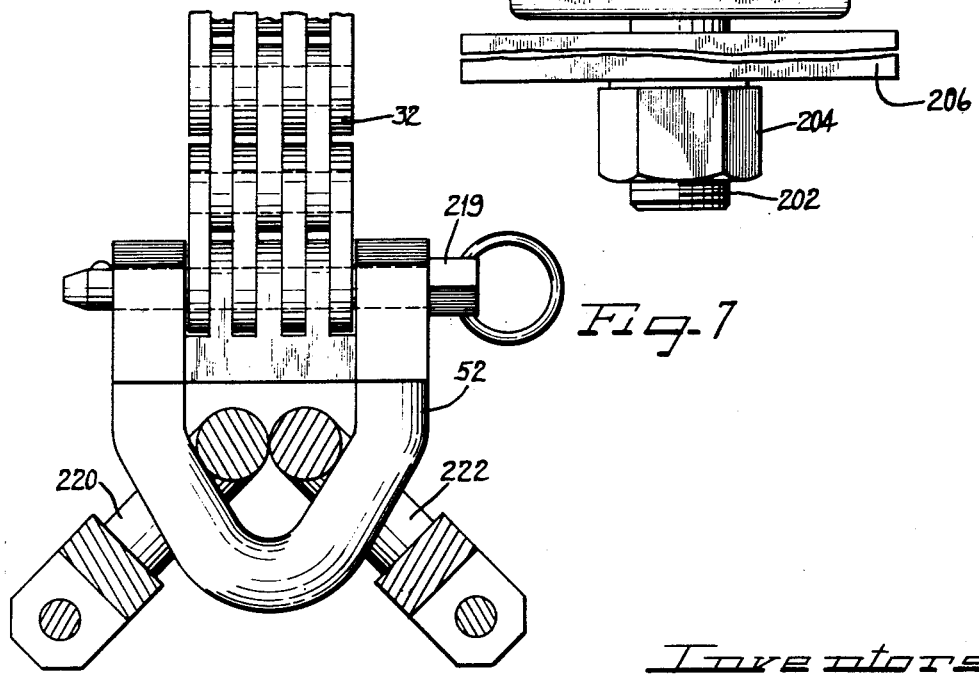
Inventors
Rollin Douglas Rumsey

2,942,867
DAMPING SYSTEM

Rollin Douglas Rumsey, Buffalo, N.Y., assignor to Houdaille Industries, Inc., Buffalo, N.Y., a corporation of Michigan Filed June 23, 1958, Ser. No. 743,548

16 Claims. (Cl. 267—1)

This invention relates to a damping device and more particularly to a damper adapted for use on a vehicular trailer carried "piggy back" on a railroad flatcar or the like.

Heretofore, various types of dampers have been available for use in heavy equipment of the type described but have been unsatisfactory for the reason that they were not adapted to withstand the impact forces generated during "humping" movements of a flatcar or the like.

In the present invention, a trailer adapted to carry a heavy load is mounted on a flatcar by a chain structure pivotally secured within a damper transversely positioned on the trailer, the outer end of the chain being joined to a Y-shaped chain attached to spaced apart fittings received in stake pockets on the flatcar, which are adapted to take up slack in the chain structure to a desired extent to even the load on the separate elements of the Y-shaped portion thereof. The damper is characterized by gravity responsive means adapted to open a flow valve in the damper when a predetermined force is applied thereto during "humping" or starting and stopping of the flatcar, so that fluid may pass from one side of a damper piston to the other side thereof to permit uniform damping movement of the piston in the damper casing.

The damper also provides a safety relief means adapted to reduce the load on the damper piston when an excessive impact load is exerted on the piston through the chain means described so that if adjustment of the two chains in the Y-portion thereof should be unequal, the chain bearing the load will not break.

Accordingly, it is an object of the present invention to provide a damper which is responsive to gravity means to open a flow valve in the damper piston so as to afford a uniform damping movement thereof.

Another object of the invention is to provide a damper for use in mounting a trailer on a flatcar, the damper being mounted transversely to the motion of the flatcar and having a weight mounted on a valve in a manner which serves to open the valve when the trailer is accelerated or decelerated by starting or stopping impact on the flatcar.

Another object of the invention is to provide a damper as described in which a safety relief valve is associated with the gravity actuated valve and is responsive to predetermined tension on the damper piston to open the gravity actuated valve and afford movement of the damping piston such as to reduce the load thereon.

Another object of the invention is to provide a damper system as described in which the trailer is carried on the flatcar with its longitudinal axis aligned with the longitudinal axis of the flatcar, the damper having a chain means extending therefrom through a swivel guide structure and connected by a Y-chain to a pair of anchor elements which are adjustable to afford equal stress on the chain.

Another object of the invention is to provide a damper as described in which the chain is connected within the damper casing to a load transmitting member which is rotatably mounted on the tension receiving end of the damper piston so as to permit rotational adjustment of the chain means without producing a corresponding rotation of the piston.

Another object of the invention is to provide a damper as described in which the piston is spring biased in a direction opposite to the tension exerted thereon and a cup-shaped replenishing piston is telescopically received therein and adapted to cooperate with spring means for the damper piston to afford a desired pressure on each side of the damper piston.

Yet another object of the invention is to provide a damper as described in which the safety relief valve contains a pressure relief valve means to afford a desired pressure on either side of the damper piston.

Other objects and advantages of the invention will become apparent as the description proceeds in accordance with the drawings in which:

Figure 1 is a side elevational view of a damper according to the present invention;

Figure 2 is a vertical sectional view of the damper shown in Figure 1;

Figure 3 is an end elevation of the damper and means for fastening the damper relative to a flatcar or the like;

Figure 4 is an enlarged sectional view of the gravity actuated valve means for the damper;

Figure 5 is an enlarged sectional view of the valve structure for the replenishing system of the damper;

Figure 6 is an elevational view, partly in vertical section, of anchor means for the fastening means shown in Figure 3; and Figure 7 is an enlarged view of the chain means for the damper system and bracket and Y-chain elements therefor.

Referring now to Figures 1 and 2, a damper 10 is shown according to the present invention comprising a casing 12 having a cylindrical longitudinally extending wall 14, a damper piston 16 having a piston head 18 slidably received in the casing 12 and a cup-shaped replenishing piston 20 slidably received in the casing 12. A sleeve 22 is mounted on an annular plate 24 at one end of the casing 12 and in predetermined radially spaced relationship to the cylindrical wall 14, a sleeve 26 being mounted on the piston head 18 and an annular shoulder 28 thereof in coaxial telescoping and overlapping relationship with the piston 22. A load transmitting member 30 is rotatably secured on the tension receiving end of the piston 16 for receiving tension loads through a chain 32, and the piston is biased in a direction opposite to such loads by spring means 34 surrounding the sleeves 22 and 26. A spring 35 biases the piston 20 in the other direction to maintain a predetermined hydraulic pressure in the casing on each side of the piston head 18 as hereinafter further described, and valve means 36 are provided according to the invention for permitting fluid to pass from one side of the piston head 18 to the other so as to afford damping movement of the piston 16.

As seen in Figure 3, the chain 32 is of the leaf-type and is formed from a plurality of parallel links 32a in each section thereof, tension being imparted to the chain 32 from a pair of similar chains 40 and 42 secured thereto in a Y-shaped relationship and anchored in anchor fittings 44 and 46 secured in stake pockets on a flatcar 48. The flatcar carries a trailer 50 upon which the damper 10 is transversely mounted, the axis of the trailer being substantially parallel to the longitudinal axis of the flatcar 48 so that the chains 40 and 42 are adapted to take up relative forward or rearward motion in the trailer as the case may be as induced by "humping" on starting and stopping of the flatcar. The chains 40 and 42 are adjustably mounted in the anchor means 44 and 46 and connected to the chain 32 by bracket means 52 for full pivotal movement relation thereto as hereinafter further described.

The piston head 18 of the damper piston 16 defines an annular recess 54 for receiving an O-ring 56. An annular bearing 57 thereon engages one end of the spring 34, the opposite end thereof seating against a corresponding annular bearing 58 positioned on a shoulder 60 defined by the end plate 24. The spring 34 is dimensioned so that its radius substantially corresponds to the radius of the sleeves 22 and 26, and it is accordingly maintained against contact with the cylindrical wall 14 by these sleeves.

The sleeve 26 is apertured as seen at 62 to admit fluid into the area between the sleeve 26 and the wall 14 as well as the area between the sleeve 22 and the wall 14, and an annular orifice 64 is also defined between the sleeves 22 and 26 for this purpose. However, so as to prevent fluid from entering the interior of the sleeve 22 and interfering with the movement and functioning of the chain 34, the sleeve 22 is provided with an annular plate 66 which is disposed in sealing relationship to the reduced shaft portion 68 of the piston 16 by means of an O-ring 70 received in an annular recess 72. The plate 66 may also have a recess 74 therein for receiving an O-ring 76 between the plate and the sleeve 22.

In order to permit movement of the chain 32 in a direction corresponding to the direction of the load applied thereto, a guide element 78 is journalled in the plate 24 by means of a bearing 80 and a retainer ring 82 and a guide sleeve 84 is formed on the guide element 78 which has an arcuate configuration so that the chain 32 may pass easily therethrough. Corresponding rotational movement in the piston 16 is prevented by means of the load transmitting member 30 which includes a socket member 86 having a cylindrical upstanding side wall 88 mounted on the base wall 90 thereof and an inwardly turned bearing hook or flange 92 disposed in predetermined spaced relation to the wall 90. A suitable bracket 94 is formed on the base 90 for pivotally receiving the end of the chain 32. The end of the shaft 68 adjacent the chain 32 is provided with a nut 96 which defines a bearing shoulder 98 adapted to receive tension loads from a roller thrust bearing 100 which is received between the bearing flange 92 and the bearing shoulder 98, on the load transmitting member 30 and the piston 16 respectively. The thrust bearing 100 may include a pair of annular bearing walls 102 and 104 spaced in abutting engagement with the shoulder 98 and the flange 92 respectively by upper and lower rollers 106 and 108 retained by upper and lower bearing elements 110 and 112 respectively and extending around the thrust bearing 100 as will be readily understood by those skilled in the art.

The piston 20 has a piston flange 114 slidably received in casing 12, the spring 35 for the replenishing piston 20 bearing against the piston flange 114 and bearing ring 115 thereon at one end and against an end plate 116 and bearing ring 118 at the other end. The piston flange 114 is maintained in sealed relation to the wall 14 by means of an O-ring 114a. The replenishing piston 20 is substantially cup-shaped and is slidably received along the cylindrical wall 118 within the end plate 116. An inwardly extending boss 122 in the piston 20 receives a filler means 124 which includes a spring biased valve 126 for selectively closing a passage 128 defined in the boss 122 and in a valve insert plug 130, a filter 132 permitting flow of fluid from the passage 128 through a passage 134 opening into the portion of the casing on the outer side of the piston head 18 when fluid is introduced into the means 124 under pressure. Thus the spring 35 and the fluid within the portion of the casing on the outer side of the piston 18 cooperate to provide a pressure which counteracts the pressure afforded by the damping spring 34 and the fluid on the inner side of the piston.

In order to permit fluid flow from one side of the piston head 18 to the other during damping, the valve means 36 is adapted to be gravity responsive to changes in speed in the damper 10 afforded by relative motion between the trailer 50 and the supporting flatcar 48, such as are produced by humping or the like. The valve means 36 include a valve piston 136 slidably mounted within a piston bore 138 defined axially in the piston 16 and extending from the end of the piston on the outer side of the piston head 18 (adjacent the replenishing piston 20) to the inner side of the piston head 18 (adjacent piston shaft 68). The valve piston 136 includes a valve head 140 formed integrally at the outer end of the piston shaft 142 and a piston head 144 at the other end which may define a recess 146 for receiving an O-ring 148. The valve piston 136 is biased into closed position by means of a helical spring 150 which bears against a shoulder 152 of the valve head 140 at one end thereof and against the bottom wall 153 of a cup-shaped bracket 154 at the other end thereof. This bracket may be mounted along its annular lip or flange 155 upon a metallic nut 156 of predetermined thickness which is threadedly engaged upon the outer end of the shaft 68. A plurality of preferably canted ports 157 are provided in the piston shaft 68 of the piston 16 communicating with the piston bore 138 and the interior of the casing 12. The hydraulic fluid within the casing 12 and spring 150 will retain the valve head 140 against opening until a predetermined gravity load is imposed upon the damper 10 by inertial starting or stopping force exerted along the longitudinal axis of the trailer 50 and along the transverse axis of the damper 10. These forces, which are occasioned by a relative change of speed in the trailer and the damper, are adapted to open the valve head 140 by acting upon a weight 158. The weight 158 is mounted on an axially extending shaft 160 which is spaced a predetermined distance from a skirt portion 162 formed integrally on the shaft 160 and held flat against the bottom wall of the cup-shaped bracket 154 by the spring 150 and linkage means 164. Thus the bottom wall 153 of the bracket 154 defines a seat 165 for a preferably tapered plug 166 formed integrally on the skirt 162, the plug 166 forming a socket for a ball joint 167 at one end of the linkage 164. A similar ball joint 168 is formed at the other end of the linkage 164 and is received in a similar socket provided by the valve head 140. Gravity forces transmitted transversely to the axis of the casing 10 will accordingly cause the weight 158 to pivot about an edge of the skirt 162 when they are of a predetermined amount, the radius of this skirt being dimensioned to cooperate with the length of the shaft 160 and the weight of the element 158, as well as the resistance afforded by the spring 150, to determine this limit. When such pivoting action occurs, the linkage 164 transmits the force exerted on the weight 158 to open the valve head 140 and permit fluid to pass freely through the ports 157 and through the cup-shaped socket 154 and the seat 165 into the outer end of the casing 12. The passageways 157 thus permit a controlled movement of fluid from the inner side of the piston head 18 to the outer end of the casing, which cooperates with the action of the spring 34 in providing a uniform deceleration of the load. Return of the fluid after damping is afforded by fluid under pressure from the piston 20 acting upon a piston valve 170 which is spring-biased to close a passage 172 in the piston head 18, the shaft of the piston 170 being received in a bearing 174 which defines a plurality of openings 176.

The damping action provided by the damper 10 may be calibrated to reduce longitudinal acceleration force due to "humping" from 16 g's to 4 g's, for example, and in one embodiment of the damper four units may be used for an eight or nine ton trailer or two units on a four ton trailer, as compared with many times this number where conventional dampers are employed.

Because the chains 40 and 42 for the damper 10 may by inadvertence be unevenly adjusted, although adjustment means are provided as hereinafter set forth, a disproportionate amount of the load might be transmitted through one of the chains and might tend to break or damage it. To obviate this possibility, a safety relief means is provided in the valve structure 36 of the piston 16, which includes a piston 178 slidably received in a piston bore 180 in the piston 136. The piston 178 is urged by a spring 182 into closing relationship with a passage 184 defined in the piston 136, and to permit opening of this passage, a reduced valve portion 186 is defined in the piston 178 extending from a shoulder 188. A port 190 is formed in the piston 136 between the passage 184 and the shoulder 188 and in communication with the piston bore 138 and the piston bore 180, and when a sudden shock such as might damage the chain is transmitted to the piston 16, fluid force will be transmitted through the ports 157 and 190 to the shoulder 188 such as to cause the piston 178 to retract and open the passage 184 to a chamber 192 provided by the bore 138 and the piston head 144. The fluid in the chamber 192 will thereupon act upon the piston head 144 to move the valve 136 and the valve head 140 into open position to afford free passage of fluid from one side of the piston head 18 to the other as hereinbefore described to reduce the load on the chain.

When the pressure drops below the predetermined level piston 178 reseats against the nut defining passageway 184 and valve 140 gradually closes as fluid from chamber 192 leaks off through orifice 196 in the piston 178 and a corresponding orifice 198 in the piston 136, these passages being of relatively reduced diameter relative to the passage 184 so that the pressure transmitted to the chamber 192 as above described will be almost entirely utilized in opening of the valve head 140.

Referring now to Figures 6 and 7, it will be seen that the anchor means 44 and 46 of the invention include a fitting 200, as seen in Figure 6, adapted to be secured in a stake pocket of the flatcar by means of a stud 202, a nut 204 and a washer 206. The fitting 200 includes a square ended shaft 208 journalled in the fitting 200 and adapted to be engaged by a wrench for tightening. In order to afford adjustment of the tension on the chains, a plurality of suitably configured sprocket plates 210 are keyed upon the shaft 208 in parallel abutting relationship, the sprocket plates 210 having a width substantially corresponding to the width of the chain links 32a and adapted to engage the individual sections of the chains 40 and 42 so that torque on the shaft 208 will be effective to tighten the chains or loosen them as desired. In order to afford locking of the chains in a desired adjustment position, the sprocket plates 210 are provided with a plurality of radially spaced apertures 212 which are preferably disposed at substantially 18° increments from one another around the sprocket plates. The fitting or mounting 210 is provided with a pair of apertures 214 and 216 for receiving therethrough a suitable pin 218 and when the apertures 214 and 216 are in registration with corresponding apertures in the sprocket plates 210, the pin is inserted to lock the chain.

A full swivel movement of the chains 40 and 42 relative to the chain 32 is afforded by the bracket 52 shown in Figure 2, the chain 32 being secured to the bracket by means of a suitable pin 219. The bracket 52 is substantially U-shaped for this purpose and has its lower end formed in a predetermined angle such that eye brackets 220 and 222 on the chains 40 and 42 are enabled to pivot in response to the decelerating movement of the trailer provided by the damper 10.

There has thus been provided a damper which is of simple and strong construction and which may be made to accommodate predetermined loads from humping or sudden changes in rate in a flatcar or the like acting on a trailer at a uniform rate of deceleration. The adjustable fastening means between the flatcar and the trailer are afforded free rotational and pivotal movement relatively to the transversely mounted damper, without effecting similar movement in the damper piston, and the passage of fluid from one side of the damper piston to the other is controlled by gravity responsive means such that no variation in control will occur from wear or other factors such as are inherent in conventional damping means. The flow is controlled by metering orifices in the damper which are likewise free from wear and variation in performance, while the compact, nested relationship of the flow valve, the safety relief valve and the pressure equalizing valve of the invention affords exceptional efficiency and compactness as well as accuracy in control of damping action.

Although I have herein described and set forth my invention with respect to certain specific principles and details thereof, it will be obvious to those skilled in the art that these may be varied without departing from the spirit and scope of the invention as set forth in the hereunto appended claims.

I claim as my invention:

1. A damper comprising a casing, a piston having a piston head slidably received in said casing, said piston defining a passage between opposite sides of said piston head, an hydraulic fluid in said casing, means adapted to transmit axial tension force to one end of said piston, spring means on one side of said piston head biasing said piston in a direction opposite to the direction of said tension force, a replenishing piston slidably received in said casing at the other side of said piston head, a spring biasing said replenishing piston toward said piston head, a valve means urging said valve to close said passage in said piston and weight means on said valve constructed to overcome said means urging said valve to close said passage and to open said valve in response to a predetermined change of speed in said damper.

2. A damper comprising a casing, a piston having a piston head slidably received in said casing, said piston defining a passage between opposite sides of said piston head, an hydraulic fluid in said casing, means adapted to transmit axial tension force to one end of said piston, spring means on one side of said piston head biasing said piston in a direction opposite to the direction of said tension force, a cup-shaped replenishing piston slidably received in said casing at the other side of said piston head, a spring biasing said replenishing piston toward said piston head to afford a counter pressure to said first spring on said first piston, a valve, means urging said valve to close said passage in said piston and weight means connected to said valve having a mass such as to overcome said means urging said valve to close said passage to open said valve in response to a predetermined change of speed in said damper.

3. A damper comprising a casing, a piston having a piston head slidably received in said casing, a passage defined in said piston between opposite sides of said piston head, a sleeve secured to one end of said casing in coaxial, radially spaced relationship thereto, a plate secured in the opposite end of said sleeve slidably receiving said piston in sealing relation thereto, means for exerting tension on said piston slidably received in said sleeve, a second apertured sleeve secured to said piston head and disposed in telescopically overlapping coaxial relation to said first sleeve, a helical spring between said one end of said casing and said piston head urging said piston away from said one end of said casing, said first and second sleeves cooperating to maintain said helical spring in spaced relation to the longitudinally extending wall of said casing, valve means, means urging said valve to close said passage and weight means connected to said valve means and responsive to a predetermined inertial force to open said valve to afford damping motion of said piston.

4. A damper comprising a casing, a piston slidably received in said casing, a passage defined in said piston affording communication between opposite sides of said piston and providing a control orifice therein, a valve piston slidably received in said passage, a bracket on said piston head, a spring in said bracket biasing said valve to closed position, a weight having a rigid shaft connected to said valve piston through said bracket and a skirt on said shaft cooperating with said bracket and said weight to afford opening of said valve piston in response to predetermined gravity impact on said weight.

5. A damper comprising a cylindrical casing, an annular plate in one end of said casing, a sleeve secured to said plate at one end thereof in coaxial radially spaced relationship to said casing, a piston having a piston head slidably received in said casing, an apertured second sleeve secured to the piston head of said piston and extending in overlapping telescopic coaxial relationship to the first sleeve to define an annular orifice therewith, an annular plate at the other end of said first sleeve slidably receiving said piston therethrough in sealing relationship therewith, means for transmitting tension to the end of said piston within said first sleeve and slidably and rotatably disposed in said first sleeve, a guide member defining an arcuate guide sleeve journalled in said first annular plate, an elongated flexible element secured to said means for transmitting tension to said piston and extending through said guide sleeve of said guide member, valve means affording communication between opposite sides of said piston head and gravity responsive means connected in predetermined relationship to said valve means for opening said valve means in response to a predetermined change in speed in said damper.

6. In a damper having a casing, a piston slidably received in said casing and means affording a predetermined rate of deceleration for said piston in response to a predetermined tension load exerted on one end thereof, a socket element having a cylindrical side wall and an inwardly turned bearing flange on said cylindrical side wall, a bearing shoulder on said end of said piston received within said socket, roller thrust bearing means between said bearing flange and said bearing shoulder for transmitting tension loads to said end of said bearing shoulder while affording rotatable movement of said socket element relative to said piston, a guide element journalled in the end of said casing adjacent the end of said piston having an arcuate guide sleeve therein and an elongated flexible element secured to said socket and extending through said guide sleeve, said guide element and said guide sleeve therein being adapted to swivel in the direction of a load exerted on said flexible element.

7. A damper comprising a cylindrical casing, an annular plate in one end of said casing, a sleeve secured to said plate at one end thereof in coaxial radially spaced relationship to said casing, a piston having a piston head slidably received in said casing, an apertured second sleeve secured to the piston head of said piston and extending in overlapping telescopic coaxial relationship to the first sleeve to define an annular orifice therewith, an annular plate secured in sealing relationship in the other end of said first sleeve and slidably receiving said piston therethrough in sealing relationship therewith, means for transmitting tension to the end of said piston within said first sleeve slidably and rotatably disposed in said first sleeve, a guide member defining an arcuate guide sleeve journalled in said first annular plate, an elongated flexible element secured to said means for transmitting tension to said piston and extending through the guide sleeve of said guide member, valve means affording communication between opposite sides of said piston head and gravity responsive means connected in predetermined relationship to said valve means for opening the valve in response to a predetermined change in speed in said damper, said means for transmitting tension to said piston including a socket element having a cylindrical side wall and an inwardly turned bearing flange on said side wall, said piston having a bearing shoulder within said socket at a tension receiving end thereof, and roller thrust bearing means between said bearing flange and said bearing shoulder for transmitting tension loads to said end of said piston while affording rotatable movement of said elongated flexible element and said socket element relative to said piston.

8. A damper comprising a casing, a piston having a piston head slidably received in said casing, an hydraulic fluid in said casing, a piston bore defined in a shaft of said piston opening at an end of said piston shaft on one side of said piston head and extending to the other side of said piston head, a control orifice communicating between the interior of said casing on said other side of said piston head and said bore, a valve piston slidably received in said piston bore, said valve piston having a piston head at an inner end thereof and a valve head adapted to close said bore at an outer end thereof adjacent the open end of said bore, means biasing said valve piston and valve head to closed position in said bore, a weight mounted in connected relationship to said valve piston and responsive to a predetermined speed change in said damper to move said valve piston to an open position in said bore, a piston bore in said valve piston, a passage extending from said second piston bore through said piston head in said valve piston and affording communication between said first piston bore and said second piston bore, a piston in said second piston bore having a reduced valve head portion, means biasing said piston in said second piston bore and said reduced piston head portion thereof into closing position relative to said passage extending from said second piston bore through said valve head in said valve piston, a shoulder defined between the reduced valve head portion of said piston in said second piston bore and the outer portion thereof and an orifice in said valve piston communicating between said first piston bore and said second piston bore and disposed between said passage between said first and second piston bores and said shoulder on said piston in said second piston bore, said piston in said second piston bore being adapted to open said passage between said first and second piston bores in response to a predetermined damping load on said piston slidably received in said casing to move said valve piston into open position and to afford a safety relief means for the damper.

9. A damper comprising a casing, a piston having a piston head slidably received in said casing, an hydraulic fluid in said casing, a piston bore defined in said piston opening at an end of said piston on one side of said piston head and extending to the other side of said piston head, an orifice communicating between the interior of said casing on the other side of said piston head and said piston bore, a valve piston slidably received in said piston bore having a piston head at an inner end thereof and a valve head adapted to close said piston bore at an outer end thereof, means biasing said valve piston and valve head to closed position in said piston bore, a piston bore in said valve piston, a passage extending from said second piston bore through said piston head in said valve piston and affording communication between said first and second piston bores, a piston in said second piston bore having a reduced valve head portion, means biasing said piston in said second piston bore and said reduced piston head portion thereof into closing position relative to said passage extending from said second piston bore through said valve head in said piston valve, a shoulder defined between the reduced valve head portion of said piston in said second piston bore and the outer portion thereof and an orifice in said valve piston communicating between said first and second piston bores and spaced intermediately of said passage between said first and second piston bores and said shoulder, said piston and reduced valve head portion in said second piston bore being adapted to open said passage between said first and second piston bores in response to a predetermined damping load on said first piston slidably received in said casing to move said piston valve into open position and to afford a safety relief means for the damper.

10. In a damping system, a device to be decelerated, a support for said device, a cylindrical casing secured to said device, an annular plate in one end of said casing, a sleeve secured to said plate at one end thereof in coaxial radially spaced relationship to said casing, a piston having a piston head slidably received in said casing, an apertured second sleeve secured to the piston head of said piston and extending in overlapping telescopic coaxial relationship to the first sleeve to define an annular orifice therewith, an annular plate at the other end of said first sleeve slidably receiving said piston therethrough in sealing relationship therewith, means for transmitting tension to the end of said piston within said first sleeve slidably and rotatably disposed in said first sleeve, a guide member defining an arcuate guide sleeve journalled in said first annular plate, a chain secured to said means for transmitting tension to said piston and extending through the guide sleeve of said guide member journalled in said first plate, valve means affording communication between opposite sides of said piston head, gravity responsive means connected in predetermined relationship to a valve of said valve means for opening the valve in response to a predetermined change in speed in said damper, bracket means on said chain outside said casing, a pair of tie down chains pivotally secured to said bracket means in full swivelling relationship thereto and anchor means for each of said pair of chains disposed in predetermined spaced apart relationship on said support for said device.

11. A damper assembly comprising a device to be decelerated, a support for said device, a cylindrical casing secured to said device, an annular plate in one end of said casing, a sleeve secured to said plate at one end thereof in coaxial radially spaced relationship to said casing, a piston having a piston head slidably received in said casing, an apertured second sleeve secured to the piston head of said piston and extending in overlapping telescopic coaxial relationship to said first sleeve, an annular plate at the other end of said first sleeve slidably receiving said piston therethrough in sealing relationship therewith, means for transmitting tension to the end of said piston within said first sleeve slidably and rotatably disposed in said first sleeve, a guide member defining an arcuate guide sleeve journalled in said first annular plate, a chain secured to said means for transmitting tension to said piston and extending through the guide sleeve of said guide member, a pair of chains secured to said chain at one end and to said support at one other end thereof, a piston bore defined in said piston opening at an end of said piston on one side of said piston head and extending to the other side of said piston head, an orifice communicating between the interior of said casing on the other side of said piston head and said piston bore, a valve piston slidably received in said piston bore having a piston head at an inner end thereof and a valve head adapted to close said bore at an outer end thereof, means biasing said valve piston and valve head to closed position in said piston bore, a weight mounted in predetermined connected relation to said valve piston and responsive to a predetermined speed change in said damper to move said valve piston to open position in said bore, a piston bore in said valve piston, a passage extending from said second piston bore through said piston head in said valve piston affording communication between said first and second bores, a piston in said second piston bore having a reduced valve head portion and a shoulder between the reduced valve head portion of said piston in said second piston bore and the outer portion thereof, an orifice in said valve piston communicating between said first and second piston bores and spaced intermediately of said passage between said first and second piston bores and said shoulder, said piston and reduced valve head portion in said second piston bore being biased to close said passage and adapted to open said passage in response to a predetermined damping load on said piston slidably received in said casing to move said piston valve into open position and to afford a safety relief means for the damper assembly for preventing damage thereto in the event loads in excess of a predetermined level are imposed thereupon.

12. A damper comprising a casing, a piston having a piston head slidably received in said casing, a hydraulic fluid in said casing, a piston bore defined in said piston opening at an end of said piston on one side of said piston head and extending to the other side of said piston head, an orifice communicating between the interior of said casing on the other side of said piston head and said bore, a valve piston slidably received in said piston bore having a piston head at an inner end thereof and a valve head adapted to close said piston bore at an outer end thereof, means biasing said valve piston and valve head to closed position in said bore, a piston bore in said valve piston, a passage extending from said second piston bore through said piston head in said valve piston and affording communication between said first and second piston bores, a piston in said second piston bore having a reduced valve head portion, means biasing said piston in said second piston bore and said reduced piston head portion thereof into closing position relative to said passage extending from said second piston bore through said valve head in said piston valve, a shoulder defined between the reduced valve head portion of said piston in said second piston bore and the outer portion thereof, an orifice in said valve piston communicating between said first and second piston bores and spaced intermediately of said passage between said first and second piston bores and said shoulder, said piston and reduced valve head portion in said second piston bore being biased to close said passage and adapted to open said passage in response to a predetermined damping load on said first piston slidably received in said casing to move said piston valve into open position to afford a safety relief means for the damper, said piston in said second piston bore and said valve piston defining normally a pressure equalizing passage in cooperation with said second piston bore adapted to transmit fluid to the outer side of the piston head of said first piston in said casing from the portion of said first piston bore disposed inwardly of said valve piston head at a rate which is substantially less than the rate of flow afforded by said passage between said first and second piston bores.

13. A damper assembly comprising a device to be decelerated, a support for said device, a cylindrical casing secured to said device, an annular plate in one end of said casing, a sleeve secured to said plate at one end thereof in coaxial radially spaced relationship to said casing, a piston having a piston head slidably received in said casing, an apertured second sleeve secured to the piston head of said piston and extending in overlapping telescopic coaxial relationship to the first sleeve, an annular plate at the other end of said first sleeve slidably receiving said piston therethrough in sealing relationship therewith, means for transmitting tension to the end of said piston within said first sleeve slidably and rotatably disposed in said first sleeve, a guide member defining an arcuate guide sleeve journalled in said first annular plate, a chain secured to said means for transmitting tension to said piston and extending through the guide sleeve of said guide member journalled in said first plate, valve means affording communication between opposite sides of said piston head and gravity responsive means mounted in predetermined connected relationship to said valve means for opening said valve means in response to a predetermined change in speed in said damper, bracket means secured to said chain outside said casing, a pair of tie down leaf chains pivotally secured to said bracket means in full swivelling relationship thereto and anchor means for each of said pair of leaf chains disposed in predetermined spaced apart relationship on said support for said device, said anchor means including a fitting having a rotatably adjustable shaft therein and a plurality of sprocket plates fixedly secured on said shaft and defining a plurality of radially spaced apertures therethrough, each of said fittings defining an aperture adapted to register with a selected aperture in said sprocket plates, and pin means for each of said fittings adapted to engage through the aperture in said fitting and the selected aperture in said sprocket plates, said sprocket plates being adapted to engage the leaf chain associated therewith in adjustable locking engagement.

14. In combination with a support and a device on said support, a damper system for said device adapted to decelerate the movement of the device relative to the support in response to sudden change in the movement of said support comprising a cylindrical casing secured to said support, an annular plate in one end of said casing, a sleeve secured to said plate at one end thereof in coaxial radially spaced relationship to said casing, a piston having a piston head slidably received in said casing, a second apertured sleeve secured to the piston head of said piston and extending in overlapping telescopic coaxial relationship to the first sleeve, an annular plate at the other end of said first sleeve slidably receiving said piston therethrough in sealing relationship therewith, means for transmitting tension to the end of said piston within said first sleeve slidably and rotatably disposed in said first sleeve, a guide member defining an arcuate guide sleeve journalled in said first annular plate, a chain secured to said means for transmitting tension to said piston and extending through the guide sleeve of said guide member journalled in said first plate, valve means affording communication between opposite sides of said piston head, gravity responsive means mounted in predetermined connected relationship to said valve means for opening said valve means in response to a predetermined change in speed in said damper, bracket means on said chain outside said casing, a pair of tie down chains pivotally secured to said bracket means in full swivelling relationship thereto and anchor means for each of said pair of chains secured to said support and disposed in spaced apart relationship on said support.

15. In a damper, a casing containing a hydraulic fluid, a piston slidably received in said casing, a passage in said piston communicating between interior portions of said casing on opposite sides of a piston head for said piston, a valve slidably disposed in said passage, a bracket mounted on said piston in register with said passage, spring means between said bracket and said valve biasing said valve to closed position, a weight having a shaft and a skirt of predetermined radius on said shaft in predetermined spaced relation to said weight and linkage means connecting said weight to said valve at said skirt to maintain said skirt in normally snugly abutting engagement with said bracket, said weight cooperating with said spring and said shaft and skirt to afford tilting movement at the edge of said skirt when a predetermined speed change is applied thereto transversely to the axis of said shaft whereby to open said valve and afford flow of fluid through said passage and damping movement of said piston in response to a load thereon.

16. In a damper, a casing containing a hydraulic fluid, a piston slidably received in said casing, a passage in said piston communicating between interior portions of said casing on opposite sides of a piston head for said piston, a valve slidably disposed in said passage, a bracket mounted on said piston in register with said passage, spring means between said bracket and said valve biasing said valve to closed position, a weight having a shaft and a skirt of predetermined radius on said shaft in predetermined spaced relation to said weight, and a link having a ball formed at each end thereof, said valve and said skirt defining sockets pivotally receiving said balls to maintain said skirt in normally snugly abutting engagement with said bracket, said weight cooperating with said spring and said shaft and skirt to afford tilting movement at the edge of said skirt when a predetermined speed change is applied thereto transversely to the axis of said shaft whereby to open said valve and afford flow of fluid through said passage and damping movement of said piston in response to a load thereon.

References Cited in the file of this patent

UNITED STATES PATENTS

| | | |
|---|---|---|
| 2,140,359 | Hanna | Dec. 13, 1938 |
| 2,144,583 | Focht | Jan. 17, 1939 |
| 2,707,119 | Bobrick | Apr. 26, 1955 |
| 2,774,448 | Hultin | Dec. 18, 1956 |

FOREIGN PATENTS

| | | |
|---|---|---|
| 35,877 | Switzerland | Dec. 6, 1905 |
| 33,699 | France | July 24, 1928 |
| | (2d addition to No. 619,053) | |

OTHER REFERENCES

German application (Kl. 62 b 40/10) 1,024,365, printed Feb. 13, 1958 (corresponding British Patent 794,354, Apr. 30, 1958).